US010606729B2

(12) United States Patent
Hosokawa et al.

(10) Patent No.: US 10,606,729 B2
(45) Date of Patent: Mar. 31, 2020

(54) ESTIMATING THE NUMBER OF CODING STYLES BY ANALYZING SOURCE CODE

(71) Applicant: INTERNATIONAL BUSINESS MACHINES CORPORATION, Armonk, NY (US)

(72) Inventors: Nobuhiro Hosokawa, Yokohama (JP); Kohichi Ono, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 15/823,739

(22) Filed: Nov. 28, 2017

(65) Prior Publication Data
US 2019/0163608 A1    May 30, 2019

(51) Int. Cl.
G06F 11/36    (2006.01)
G06F 8/77    (2018.01)

(52) U.S. Cl.
CPC ............ *G06F 11/3616* (2013.01); *G06F 8/77* (2013.01)

(58) Field of Classification Search
CPC ................................ G06F 8/77; G06F 11/3616
USPC ......................................................... 717/126
See application file for complete search history.

(56) References Cited

U.S. PATENT DOCUMENTS

| 7,912,907 | B1* | 3/2011 | Mantel | H04L 51/12 |
| | | | | 706/52 |
| 8,312,440 | B2 | 11/2012 | Iwama et al. | |
| 8,336,030 | B1* | 12/2012 | Boissy | G06F 8/71 |
| | | | | 717/122 |
| 8,627,287 | B2 | 1/2014 | Fanning et al. | |
| 8,997,055 | B2 | 3/2015 | van Gogh et al. | |
| 9,411,578 | B2* | 8/2016 | Henriksen | G06F 8/77 |
| 9,904,614 | B2 | 2/2018 | Stevens et al. | |
| 2008/0281581 | A1* | 11/2008 | Henshaw | G06F 16/353 |
| | | | | 704/9 |
| 2009/0070734 | A1* | 3/2009 | Dixon | G06F 8/71 |
| | | | | 717/102 |
| 2009/0254538 | A1 | 10/2009 | Arthurs et al. | |

(Continued)

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Lewis A Bullock, Jr.
*Assistant Examiner* — Theodore E Hebert
(74) *Attorney, Agent, or Firm* — Dmitry Paskalov

(57) ABSTRACT

The present invention may include an embodiment identifies the plurality of source code. The embodiment may extract one or more characteristics from a plurality of lines of the plurality of source code. The embodiment may analyze the one or more extracted characteristics for an inclusion relation and a congruent relation. The embodiment may generate a plurality of node relations of a plurality of nodes based on the inclusion relation and the congruent relation, where each node within the plurality of nodes corresponds to each line of the plurality of source code. The embodiment may determine a sum of the one or more nodes from the plurality of nodes that have no inclusion relation based on the analyzed inclusion relation and the analyzed congruent relation and the embodiment may display the sum of the determined one or more nodes.

17 Claims, 9 Drawing Sheets

(56) References Cited

U.S. PATENT DOCUMENTS

| | | | | |
|---|---|---|---|---|
| 2011/0283270 | A1* | 11/2011 | Gass | G06F 8/65 717/168 |
| 2014/0173563 | A1 | 6/2014 | Dias et al. | |
| 2015/0082285 | A1 | 3/2015 | Li et al. | |
| 2015/0309790 | A1* | 10/2015 | Henriksen | G06F 8/77 717/121 |
| 2016/0203330 | A1 | 7/2016 | Cecchetti et al. | |
| 2018/0349105 | A1* | 12/2018 | Makkar | G06F 8/36 |
| 2019/0163608 | A1* | 5/2019 | Hosokawa | G06F 11/3616 |

OTHER PUBLICATIONS

Frantzeskou et al., "Effective identification of source code authors using byte-level information", In Proceedings of the 28th International Conference on Software Engineering (ICSE 2006), pp. 893-896, May 20-28, 2006, Shanghai, China.

Wisse et al., "Scripting DNA: Identifying the JavaScript programmer", Digital Investigation, vol. 15, 2015, pp. 61-71.

Caliskan-Islam et al., "De-anonymizing Programmers via Code Stylometry", USENIX Association, Proceedings of the 24th USENIX Security Symposium, Aug. 12-14, 2015, Washington, D.C., pp. 255-270.

Caliskan-Islam, "Stylometric Fingerprints and Privacy Behavior in Textual Data", Ph.D Thesis, Drexel University, May 2015, pp. 1-171.

Kamiya et al., "Evolving and Hot Topics on Code Clone Detection Techniques", Journal of Computer Software, Jul. 29, 2011, pp. 29-42, vol. 28, Issue 3, Iwanami Shoten, Publishers, Tokyo, Japan.

Monden et al., "Software Quality Analysis by Code Clones in Industrial Legacy Software", Proceedings of the Eighth IEEE Symposium on Software Metrics (METRICS '02), Jun. 4-7, 2002, Ottawa, Ontario, Canada, pp. 1-8.

Spinellis, "A Tale of Four Kernels", ACM/IEEE 30th International Conference on Software Engineering, 2008, (ICSE 08), May 10-18, 2008, Leipzig, Germany, pp. 381-390.

* cited by examiner

[Line 1 (L1)]
if (str != null) {
Line Identification Label: if

```
Line Begin: Reserved Word/ Line End: Block Begin ('{')
Unary Op: Unspecified    Ternary Op: Unspecified
Binary Op: before: Exists / after: Exists
Parenthesis: after open: Not / before close: Not
Brace: after open: Not / before close: Unspecified
Angle Bracket: Unspecified
Function Literal: after: Unspecified
Block: before begin: Exists    / after begin: Not
       before end: Unspecified/ after end: Unspecified
Member: Unspec.  Delimiter: Unspec.  Terminator: Unspec.
Reserved Word: before: Not / after: Exists
```

FIG. 3A

[Line 2 (L2)]
if( a==0 ){
Line Identification Label: if

```
Line Begin: Reserved Word/ Line End: Block Begin ('{')
Unary Op: Unspecified    Ternary Op: Unspecified
Binary Op: before: Not / after: Not
Parenthesis: after open: Exists / before close: Exists
Brace: after open: Not / before close: Unspecified
Angle Bracket: Unspecified
Function Literal: after: Unspecified
Block: before begin: Not    / after begin: Not
       before end: Unspecified/ after end: Unspecified
Member: Unspec.  Delimiter: Unspec.  Terminator: Unspec.
Reserved Word: before: Not / after: Not
```

FIG. 3B

```
                    ⟋302
[Line 3 (L3)]       ⟋304
if (num > 10 && i < MAX) {    ⟋306
Line Identification Label: if                              ⟋308
┌────────────────────────────────────────────────────────────┐
│Line Begin: Reserved Word/ Line End: Block Begin ('{')      │
│Unary Op: Unspecified    Ternary Op: Unspecified            │
│Binary Op: before: Exists / after: Exists               │
│Parenthesis: after open: Not / before close: Not        │
│Brace: after open: Not / before close: Unspecified          │
│Angle Bracket: Unspecified                                  │
│Function Literal: after: Unspecified                        │
│Block: before begin: Exists   / after begin: Not        │
│       before end: Unspecified/ after end: Unspecified      │
│Member: Unspec.  Delimiter: Unspec.  Terminator: Unspec.    │
│Reserved Word: before: Not / after: Exists              │
└────────────────────────────────────────────────────────────┘
```

FIG. 3C

FIG. 3D

```
                    ,302
[Line 4 (L4)]        ,304
num = f(x) + 10;              ,306
Line Identification Label: assignment statement           ,308
Line Begin: Variable Literal/ Line End: Terminator(';')
Unary Op: Unspecified    Ternary Op: Unspecified
Binary Op: before: Exists / after: Exists
Parenthesis: after open: Not / before close: Not
Brace: after open: Unspec. / before close: Unspec.
Angle Bracket: Unspecified
Function Literal: after: Not
Block: before begin: Unspec.  / after begin: Unspec.
       before end: Unspecified/ after end: Unspecified
Member: Unspec. Delimiter: Unspec.
Terminator: before:Not/after:Not Reserved Word: Unspec.
```

FIG. 3E

```
                    ,302
[Line 5 (L5)]        ,304
str = "Dear" + name;          ,306
Line Identification Label: assignment statement           ,308
Line Begin: Variable Literal/ Line End: Terminator(';')
Unary Op: Unspecified    Ternary Op: Unspecified
Binary Op: before: Exists / after: Exists
Parenthesis: after open: Unspec. / before close: Unspec.
Brace: after open: Unspec. / before close: Unspec.
Angle Bracket: Unspecified
Function Literal: after: Unspec.
Block: before begin: Unspec.  / after begin: Unspec.
       before end: Unspecified/ after end: Unspecified
Member: Unspec. Delimiter: Unspec.
Terminator: before:Not/after:Not Reserved Word: Unspec.
```

FIG. 3F

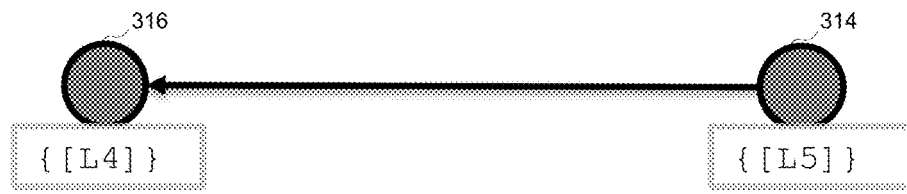

FIG. 3G

```
[Line 1 (L1)]                        [Line 3 (L3)]
if (str != null) {                   if (num > 10 && i < MAX) {
  a (X B X) {                          a (X B X B X B X) {

Bi-gram:    Tri-gram:                Bi-gram:    Tri-gram:
a  :  1     a  (  :  1               a  :  1     a  (  :  1
  (  :  1     (  X  :  1               (  :  1     (  X  :  1
  (X :  1     (X :  1                  (X :  1     (X :  1
  X  :  1     X  B  :  1               X  :  3     X  B  :  3
   B :  1      B  :  1                  B :  3      B  :  3
  B  :  1     B  X  :  1               B  :  3     B  X  :  3
   X :  1      X) :  1                  X :  3      X  :  2
  X) :  1     X) :  1                  X) :  1     X) :  1
  )  :  1     )  {  :  1               )  :  1     X) :  1
  {  :  1                              {  :  1     )  {  :  1
```

ESTIMATING THE NUMBER OF CODING STYLES BY ANALYZING SOURCE CODE

BACKGROUND

The present invention relates, generally, to the field of computing, and more particularly to quality inspection of a source code.

Source code is a text file version of a computer program or a software that contains instructions that the computer follows to do something. Source code is typically written in a programming language which a human can read and change, such as C, C++, and Java™ (Java™ is a registered trademark of Oracle Corporation and/or its affiliates). A large program may contain many different source code files that were written by different developers and combined to work together. The more developers involved in a source code creation, the more errors ("bugs") may be found in the source code.

SUMMARY

According to one embodiment, a method, computer system, and computer program product for source code analyzing is provided. The present invention may include an embodiment identifies the plurality of source code. The embodiment may extract one or more characteristics from a plurality of lines of the plurality of source code. The embodiment may analyze the one or more extracted characteristics for an inclusion relation and a congruence relation. The embodiment may generate a plurality of node relations of a plurality of nodes based on the inclusion relation and the congruence relation, where each node within the plurality of nodes corresponds to each line of the plurality of source code. The embodiment may determine a sum of the one or more nodes from the plurality of nodes that have no inclusion relation based on the analyzed inclusion relation and the analyzed congruence relation and the embodiment may display the sum of the determined one or more nodes.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3A is an example of a transformation of the first line of the source code using Spacing Characteristics Vector (SCV), according to at least one embodiment;

FIG. 3B is an example of a transformation of the second line of the source code using Spacing Characteristics Vector (SCV), according to at least one embodiment;

FIG. 3C is an example of a third line of the source code transformation using Spacing Characteristics Vector (SCV), according to at least one embodiment;

FIG. 3D is a diagram representing congruence relation between nodes generated using SCV method, according to at least one embodiment;

FIG. 3E is an example of a transformation of the fourth line of the source code using Spacing Characteristics Vector (SCV), according to at least one embodiment;

FIG. 3F is an example of a transformation of the fifth line of the source code using Spacing Characteristics Vector (SCV), according to at least one embodiment;

FIG. 3G is a diagram representing inclusion relation between nodes generated using SCV method, according to at least one embodiment;

DETAILED DESCRIPTION

Figure 1:
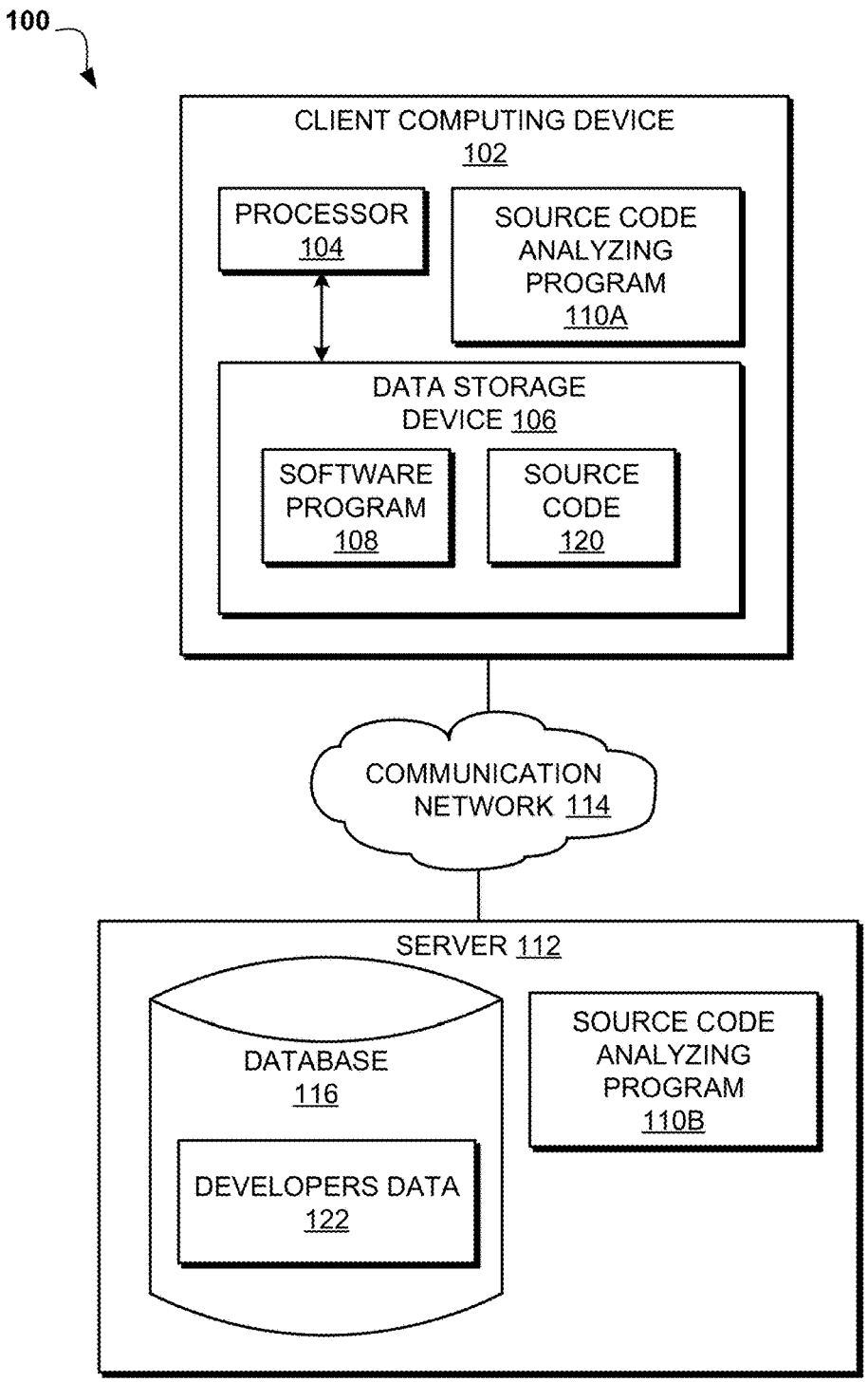
FIG. 1 illustrates an exemplary networked computer environment, according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to quality inspection of a source code. The following described exemplary embodiments provide a system, method, and program product to, among other things, estimate the number of coding styles in a source code by analyzing the textual representations of the one or more parts of the source code and associating the one or more textual representations with one or more developers. Therefore, the present embodiment has the capacity to improve the technical field of quality inspection of a source code by determining the number of coding styles of the source code by analyzing the source code using either the spacing characteristics vector or spacing N-gram transformation. The number of coding styles correlates with the number of developers who engaged in writing the source code. Under the correlation, the number of developers who wrote the source code directory and/or indirectly may be determined.

As previously described, source code is a text file version of a computer program or a software that contains instructions that the computer follows to do something. Source code is typically written in a programming language which a human can read and change, such as C, C++, and Java™. A large program may contain many different source code files that were written by different developers and combined to work together. The more developers involved in one source code creation, the more errors ("bugs") may be found in the source code.

Many tasks are currently performed by computers. In order to ensure proper task execution a computer requires execution of a software program. Software is typically compiled from source code that is written by one or more developers. Due to high competition in the software market, more than one developer may write source code, or the developer may copy parts of source code from different programs developed by another developer. Typically, source code written by more than one developer is complicated and may incorporate many mistakes (e.g., software bugs), especially while using or applying the functions and variables created by other developers. As such, it may be advantageous to, among other things, implement a system that may receive source code and, by analyzing the textual representation of the source code, estimate a number of coding styles which are proportional to a number of developers that contributed to writing the source code based on a line-by-line analysis of the source code.

According to one embodiment, a computer program may receive source code, analyze the lines of the source code to determine one or more coding styles based on transforming the one or more lines to either a Spacing Characteristics Vector (SCV) or Spacing N-Gram (SNG), and building a relation graph between the nodes to determine the number of different styles associated with one or more developers, therefore allowing to a determination that various lines of code were written by the same developer, or determining the developer who wrote an incorrect line in the source code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze a received source code and determine the number of coding styles in order to either associate the error with a specific developer or estimate the complexity of the source code based on an estimated number of developers.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a source code analyzing program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a source code analyzing program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. Database 116 may include developers data 122 that stores names of a developer and a tokenized sequences representing a writing style of each developer.

According to the present embodiment, the source code analyzing program 110A, 110B may be a program capable of receiving source code, analyzing one or more lines of the source code to determine one or more coding styles based on transforming the one or more lines to either an SCV nodes or an SNG nodes and building a relation graph between the nodes to determine the number of different styles associated with one or more developers. The process of source code analysis to estimate a number of developers is explained in further detail below with respect to FIG. 2.

Figure 2:
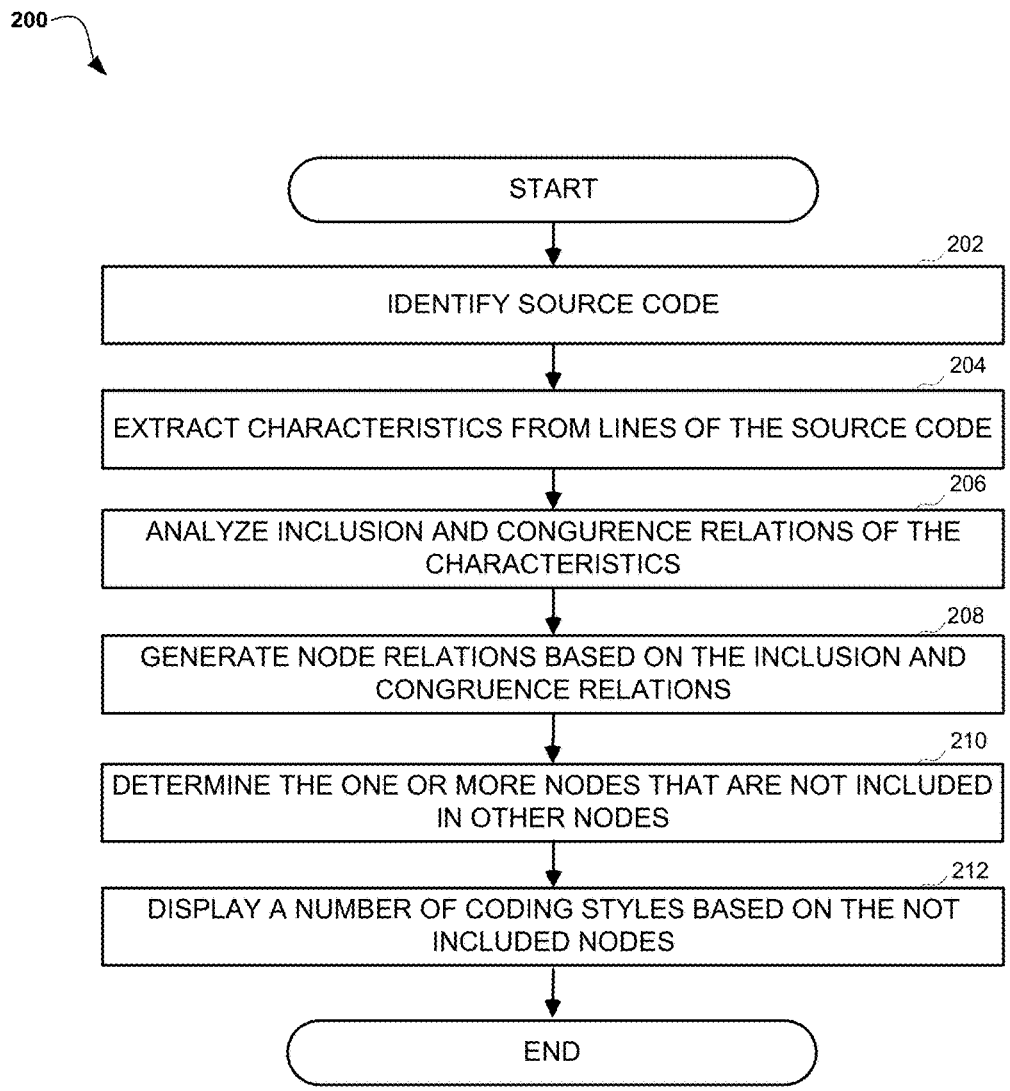
FIG. 2 is an operational flowchart illustrating a process for source code analysis to estimate a number of developers, according to at least one embodiment.

Referring now to FIG. 2, an operational flowchart illustrating a process 200 for source code analysis to estimate a number of developers is depicted, according to at least one embodiment. At 202, the source code analyzing program 110A, 110B identifies source code. According to at least one embodiment, the source code analyzing program 110A, 110B may identify an actively opened source code in the Integrated Development Environment (IDE), and load the file that stores the source code. In another embodiment, the source code analyzing program 110A, 110B, may request a user to identify a source code for analysis, for example, the source code analyzing program 110A, 110B may open a dialog box representing a data storage device 106 and ask from a user to locate the file that the user would like to analyze.

Next, at 204, source code analyzing program 110A, 110B extracts characteristics from lines of the source code. According to at least one embodiment, source code analyzing program 110A, 110B may extract characteristics from a line of a source code by transferring a line of code into a Spacing Characteristics Vector (SCV). The SCV may transform a line of the source code into a token sequence that preserves all the spaces between the commands, therefore, allowing different styles each developer utilizes while creating the source code to be distinguishable. Examples of characteristic extraction using an SCV method may be found in FIGS. 3A-3C.

The following procedures may create a node by applying an SCV ( )method to a line of the source code:

(a) As a preliminary action, source code analyzing program 110A, 110B may remove indentation at the beginning of line, and whitespaces at the end of line because these are typically added by a source code editor software.

(b) The line is decomposed into a token sequence while the whitespaces between tokens are preserved (see example in FIG. 3A.).

(c) In an instance when the line has consecutive whitespaces except a line break between tokens, source code analyzing program 110A, 110B may consolidate the whitespaces into a single space.

(d) According to at least one embodiment, source code analyzing program 110A, 110B may define a first appearance of a reserved word as a line identification label (LIL) of the line in the source code. In another embodiment, source code analyzing program 110A, 110B may, in a case where there are no reserved words in the line of the source code, associate other expressions, such as a brace as an LIL of the line. If no LIL may be determined, the source code analyzing program 110A, 110B may skip the line of source code.

(e) The source code analyzing program 110A, 110B may record the types of tokens at the beginning and the end of the line of the source code. For example, the types of tokens may be reserved words, literals, operators, brackets, terminators, and delimiters.

(f) Next, for each token, source code analyzing program 110A, 110B may inspect and summarize spacing information of each type of e token into an SCV of the line that may be represented as a node. In another embodiment, source code analyzing program 110A, 110B may preserve spacing information about existence of one or more whitespaces just before and after each token. The information about existence of each whitespace and each characteristic field in the SCV may be defined as a tri-state, such as "whitespace exists" (Exists), "whitespace does not exist" (Not), and "unspecified" (Unspecified). In another embodiment, source code analyzing program 110A, 110B may inspect the position corresponding to the type of a specific token as follows:

1. Unary operator (such as "!") to inspect the position before the operator;
2. Binary operator (such as "+", "=") to inspect the position just before and just after the operator;
3. Ternary operator (such as "?", ":") to inspect the position just before and after "T" operator, and just before and after ":" operator;
4. Bracket (such as parenthesis "(",")", braces "{","}", square brackets "[","]", angle brackets "<",">" etc.) to inspect the position just after open brackets, and just before close brackets operators;
5. Function literal to inspect the position just after the operator;
6. Block begin/end token (such as C/C++/Java™: "{", "}", Pascal: "begin", "end", etc.) to inspect the position just before and after begin/end token (In C/C++/Java™, begin/end tokens are open brace and close brace, so they are duplicated, however, both may be investigated);
   Member operator (".", "→") to inspect the position just before and after the operators;
7. Delimiter (":", ",", etc.) to inspect the position just before and after the operators;
8. Semicolon (";") to inspect the position just before and after the operator;
   Any reserved word inspect the position just before and after the reserved word; and
9. Any tokens that the source code analyzing program 110A, 110B may determine the target programming language does not use, no spacing information are summarized (ex. In C/C++/Java™, square brackets are not used).

In another embodiment, the source code analyzing program 110A, 110B may extract characteristics from a line of source code by transferring a line of code into a Spacing N-Gram (SNG). N-Grams are contiguous sequences of n items from a given sequence of text used in computational linguistics and probability determinations. Each one of the n items may be phonemes, syllables, letters, words or base pairs according to the application. The following procedures may create an SNG of a line of the source code:

(a) As a preliminary action, source code analyzing program 110A, 110B may remove indentation at the beginning of a line and whitespaces at the end of a line since these are typically added by a source code editor software.

(b) The source code analyzing program 110A, 110B may decompose the line of the code into a token sequence while whitespaces between the tokens are preserved.

(c) The source code analyzing program 110A, 110B may consolidate the consecutive whitespaces into single spaces except in the instances where there is a line break between the tokens.

(d) The first appearance of a reserved word is defined by the source code analyzing program 110A, 110B as an LIL of the line. If the line has no reserved words, the source code analyzing program 110A, 110B may use an expression, a brace as an LIL of the line. If an LIL of the line is not a targeted label by the source code analyzing program 110A, 110B (for example "if"), then tokenization of the line may be skipped.

(e) During tokenization source code analyzing program 110A, 110B may transform a reserved word into the corresponding letter (typically of one character). For example, instruction "if" may be assigned a letter "a" while instruction "else" may be assigned letter "b".

(f) Similarly, source code analyzing program 110A, 110B may transform any operator, delimiter, or terminator, into the corresponding letter, such as unary, binary or trinary operators may be transformed into letter "A", binary operator may be transformed into a letter "B", ternary operator may be transformed into a letter "C", and delimiter may be transformed into a letter "D", etc.

(g) In a similar fashion, the source code analyzing program 110A, 110B may transform any variable name, numeric, string value, etc. into the corresponding letter (typically of one character) denoting a NAME (e.g. "X") while a functional name may be transformed into the corresponding letter denoting a FUNCNAME (e.g. "Y"). Source code analyzing program 110A, 110B may keep any bracket without transforming it. For example, a line of the code "if (func(a, 0)!=c*10) {" may be transformed onto a token sequence of "a (Y(XD X) B XBX) {", where "a" represents the LIL, "Y" represents the functional name, and B represents binary operator. Additional examples of N-Gram tokenization in FIG. 4A.

(h) Then, the source code analyzing program 110A, 110B may use an N-gram sequence, preferably of the format of Bi-gram or Tri-gram in order to divide the tokenized line of the source code into N-Gram items and counting each item in the tokenized sequence. For example, a line of code "if (num>10 && i<MAX) {" may be transformed into a tokenized sequence of "a (X B X B X B X) {" where after performing Tri-gram format the item "X B" appears 3 times in the sequence. For detailed explanation and additional examples, see FIG. 4B.

Then, at 206, the source code analyzing program 110A, 110B analyzes inclusion and congruence relation of the characteristics. According to at least one embodiment, where the characteristics were extracted by applying SCV method, the source code analyzing program 110A, 110B may determine inclusion and congruence relation by comparing each one of the characteristics of line X with the characteristics of line Y using the following logic:

(a) SCV of line X includes line Y for each characteristic $X_{(i)}$ equal to characteristic $Y_{(i)}$, where $_{(i)}$ represents a specific characteristic of a line of source code, or when $X_{(i)}$ and $Y_{(i)}$ characteristics are both "Unspecified".

(b) SCV of line X and line Y are in congruent relation if SCV of line X includes SCV of line Y, and SCV of line Y includes SCV of line X.

For example, FIG. 3E depicts characteristics of fourth line L4 of the source code and FIG. 3F depicts characteristics of fifth line of the source code where after applying the inclusion and congruence analysis, the source code analyzing program 110A, 110B may infer that L5 included in L5.

In another embodiment, where the characteristics were extracted by applying SNG method inclusion and congruence is determined by comparing each one of the items of the tokenized sequence from line X with the items of the tokenized sequence from line Y using the following logic:

(a) SNG of line X includes line Y if counts of item $X_{(i)}>0$ and $Y_{(i)}>0$ or when $X_{(i)}>0$ and item $Y_{(i)}$ does not exist in the tokenized sequence of Y line of the source code.

(b) SNG of line X and line Y are in congruent relation if SNG of line X includes SNG of line Y, and SNG of line Y includes SNG of line X.

Figures 4A, 4B:
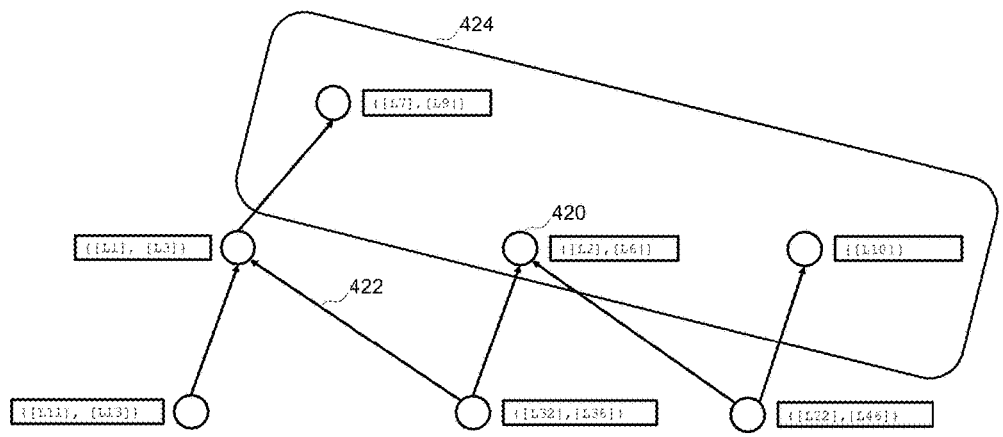
FIG. 4A is an example of a transformation of the first and third lines of the source code using Spacing N-Gram (SNG), according to at least one embodiment.
FIG. 4B is a diagram representing congruence and inclusion relations between nodes generated either by SCV or SNG methods, according to at least one embodiment.

For example, FIG. 4A depicts characteristics of first line (L1) of the source code and third line (L3) of the source code where after applying the inclusion and congruence analysis, the source code analyzing program 110A, 110B may infer that. SNG of L1 and in a congruent relation if SNG applied Bi-Gram itemization.

Then, at 208, the source code analyzing program 110A, 110B generates node relations based on the inclusion and congruence relation. According to at least one embodiment, the source code analyzing program 110A, 110B may generate a node relation by assigning a node to each line of the source code and determining whether each one of the lines of source code is included or in congruent relation to all the other lines in the source code using either SCV or SNG methods. For example, the source code analyzing program 110A, 110B may generate a graph were congruent relations between the lines of source code are merged into one node and inclusion relations are represented as an arrows between nodes, such as in FIG. 4B.

Then, at 210, the source code analyzing program 110A, 110B determines the one or more nodes that are not included in other nodes. According to at least one embodiment, the source code analyzing program 110A, 110B may determine and count the nodes that are not included in all the other nodes either by analyzing the each node relation, analyzing the node graph, or by checking each node flag that may be changed by the source code analyzing program 110A, 110B when the node is included in another node. According to at least one embodiment, the source code analyzing program 110A, 110B may count all nodes that are not included in other nodes and the count may represent a number of different styles associated with different developers.

Then, at 212, the source code analyzing program 110A, 110B displays a number of coding styles based on the not included nodes. According to at least one embodiment, the source code analyzing program 110A, 110B may display the number of coding styles that estimates a number of developers who wrote the source code without referencing any database that stores a style and a name of the developer. In another embodiment, the source code analyzing program 110A, 110B may match the independent nodes with a database such as developers data 122 and display a name of the developer if a match is found. In further embodiment, the source code analyzing program 110A, 110B may display the source code while each line is in different style, font or color to represent the different style that were used by different developers in order to identify the exact places in the source code where different blocks were added, and may also indicate that the developer did not created the code by himself.

It may be appreciated that FIG. 2 provides only an illustration of one implementation and does not imply any limitations with regard to how different embodiments may be implemented. Many modifications to the depicted environments may be made based on design and implementation requirements.

In FIG. 3A, an example of a transformation of the first line of the source code using Spacing Characteristics Vector (SCV) is depicted. According to at least one embodiment, the code analyzing program 110A, 110B may perform an analysis of the code line using SCV method described above with respect to FIG. 2. Field 302 may represent a first line L1 that was extracted from the source code and represents the line number in the source code. Field 304 may represent a command line from the source code before tokenization. Field 306 may include a reserved word that appeared in L1 and may be defined as an LIL. Field 308 represents all the characteristics that may be extracted from a command line by the code analyzing program 110A, 110B and are represented in tri state such as exists, not (exists), and unspecified. For example, code analyzing program 110A, 110B may determine whether the line begins with a reserved word such as a computer instruction and determine whether there are parentheses in the line and how many whitespaces are used before and after each operator. Fields, such as "Binary Op.", Parenthesis", "Block", and "Reserved Word" are emphasized in order to demonstrate inclusion and congruence relation between lines of the source code.

FIG. 3B depicts an example of a transformation of the second line of the source code using Spacing Characteristics Vector (SCV). According to at least one embodiment, the code analyzing program 110A, 110B may perform an analysis of the code line using SCV method described above with respect to FIG. 2. Field 302 may represent a second line L2 that was extracted from the source code and represents the line number in the source code. Field 304 may represent a command line from the source code before tokenization. Field 306 may include a reserved word that appeared in L1 and may be defined as an LIL. Field 308 represents all the characteristics that may be extracted from a command line by the code analyzing program 110A, 110B and are represented in tri state such as exists, not (exists), and unspecified. Fields, such as "Binary Op.", Parenthesis", "Block", and "Reserved Word" are emphasized in order to demonstrate inclusion and congruence relation between lines of the source code.

FIG. 3C depicts an example of a third line of the source code transformation using Spacing Characteristics Vector (SCV). According to at least one embodiment, the code analyzing program 110A, 110B may perform an analysis of the code line using SCV method described above with respect to FIG. 2. Field 302 may represent a third line L3 that was extracted from the source code and represents the line number in the source code. Field 304 may represent a command line from the source code before tokenization. Field 306 may include a reserved word that appeared in L1 and may be defined as an LIL. Field 308 represents all the characteristics that may be extracted from a command line by the code analyzing program 110A, 110B and are represented in tri state such as exists, not (exists), and unspecified. Fields, such as "Binary Op.", Parenthesis", "Block", and "Reserved Word" are emphasized in order to demonstrate inclusion and congruence relation between lines of the source code.

FIG. 3D depicts a diagram representing congruence relation between nodes generated using SCV method. According to at least one embodiment, the code analyzing program 110A, 110B may generate a graph that represents congruent relations between the lines of code were node 310 depicts that node L1 and node L3 from the examples shown in FIGS. 3A and 3C respectively, are in congruent relations while node 312 represents a second line L2 depicted in FIG. 3B is not in congruency with any other node. Congruent relations between nodes may be determined according to a method established above with respect to FIG. 2.

FIG. 3E depicts an example of a transformation of the fourth line of the source code using Spacing Characteristics Vector (SCV). According to at least one embodiment, the code analyzing program 110A, 110B may perform an analysis of the code line using SCV method described above with respect to FIG. 2. Field 302 may represent a fourth line L4 that was extracted from the source code and represents the line number in the source code. Field 304 may represent a command line from the source code before tokenization. Field 306 may include a reserved word that appeared in L1 and may be defined as an LIL. Field 308 represents all the characteristics that may be extracted from a command line by the code analyzing program 110A, 110B and are represented in tri state such as exists, not (exists), and unspecified. Fields, such as "Binary Op.", Parenthesis", "Block", and "Reserved Word" are emphasized in order to demonstrate inclusion and congruence relation between lines of the source code.

FIG. 3F depicts an example of a transformation of the fifth line of the source code using Spacing Characteristics Vector (SCV). According to at least one embodiment, the code analyzing program 110A, 110B may perform an analysis of the code line using SCV method described above with respect to FIG. 2. Field 302 may represent a fifth line L5 that was extracted from the source code and represents the line number in the source code. Field 304 may represent a command line from the source code before tokenization. Field 306 may include a reserved word that appeared in L1 and may be defined as an LIL. Field 308 represents all the characteristics that may be extracted from a command line by the code analyzing program 110A, 110B and are represented in tri state such as exists, not (exists), and unspecified. Fields, such as "Binary Op.", "Parenthesis", "Block", and "Reserved Word" are emphasized in order to demonstrate inclusion and congruence relation between lines of the source code.

FIG. 3G depicts a diagram representing inclusion relation between nodes generated using SCV method. According to at least one embodiment, the code analyzing program 110A, 110B may create a graph from nodes, such as a graph depicted in the figure that represents an inclusion relation between node 314 representing a fifth line (FIG. 3F) of the source code in node 316, representing a fourth line (FIG. 3E) of the source code. Inclusion relations between nodes may be determined according to a method established above with respect to FIG. 2.

FIG. 4A depicts an example of a transformation of the first and third lines of the source code using Spacing N-Gram (SNG). According to at least one embodiment, the code analyzing program 110A, 110B may convert a line of the source code 406 into a tokenized sequence such as a tokenized sequence 408. An example 402 represents tokenization of the first line of the source code while an example 404 represents tokenization of the third line of the source code. A tokenized sequence 408 may be converted into items using a Bi-gram 410 or Trig-gram 414 itemization. Similarly, tokenized sequence 418 may be converted into Bi-gram 412 and Tri-gram 416 items using the same SNG method. Then, the code analyzing program 110A, 110B may determine congruence and inclusion relation by comparing either Bi-grams of two different lines of the source code, such as Bi-gram 410 and Bi-gram 412 or by comparing Tri-grams of two different lines of the source code, such as Tri-gram 414 and Tri-gram 416.

FIG. 4B depicts a diagram representing congruence and inclusion relations between nodes generated either by SCV or SNG methods. According to at least one embodiment the code analyzing program 110A, 110B may generate a graph representing an inclusion relation and and congruent relation between the nodes such as node 420 represents a congruent relations between second and sixth line, and an arrow 422 represents inclusion relation, where thirty second and thirty sixth lines are included in first and third lines. After generating a relations graph, the code analyzing program 110A, 110B may determine field 424 that represents each node that is not included in any other node of the source code. A number representing a sum of the nodes in the filed 424 may represent the number of different developers that were involved in the writing of the source code.

Figure 5:
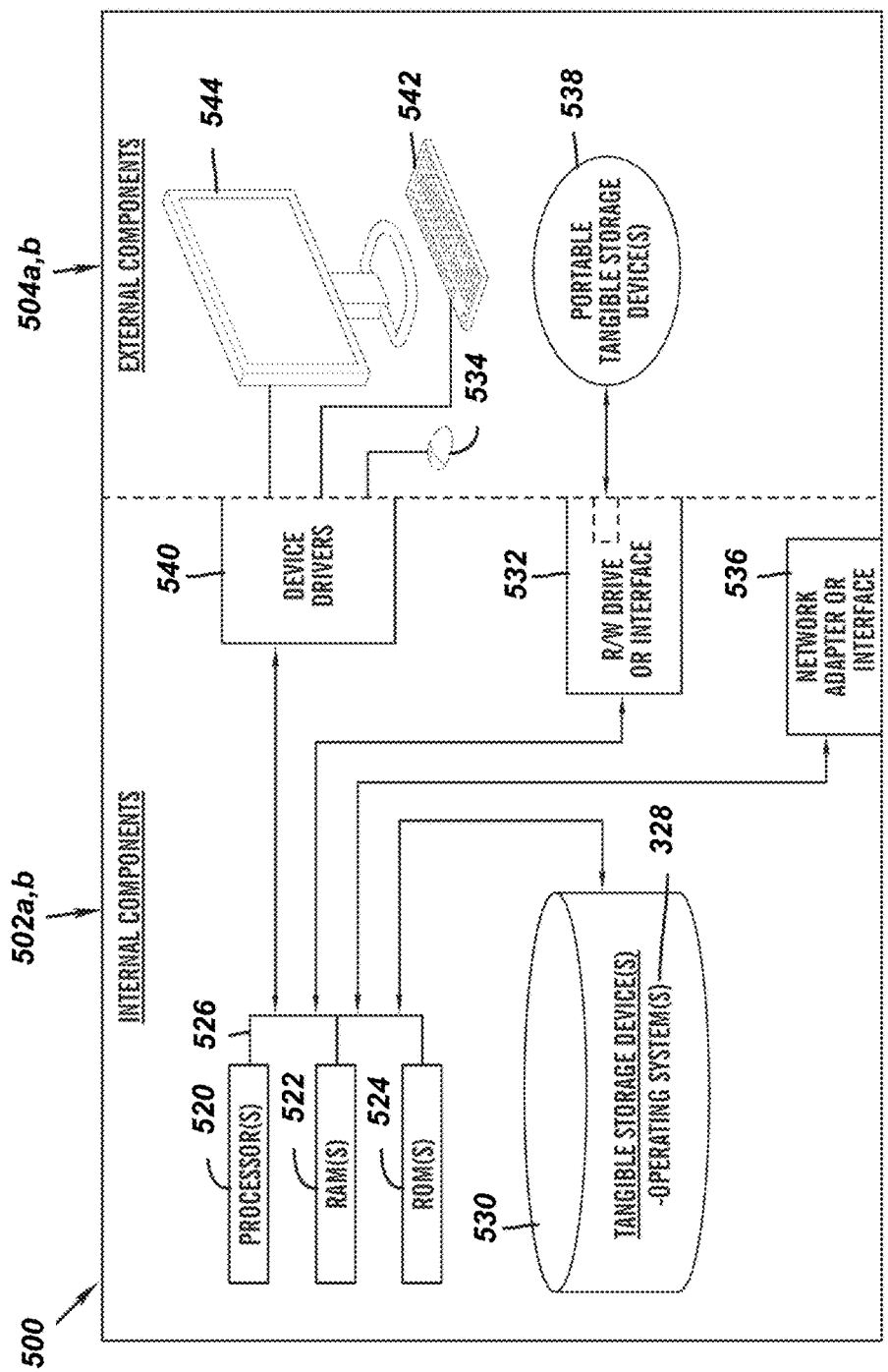
FIG. 5 is a block diagram of internal and external components of computers and servers depicted in FIG. 1, according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the source code analyzing program 110A in the client computing device 102, and the source code analyzing program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the source code analyzing program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the source code analyzing program 110A in the client computing device 102 and the source code analyzing program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the source code analyzing program 110A in the client computing device 102 and the source code analyzing program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
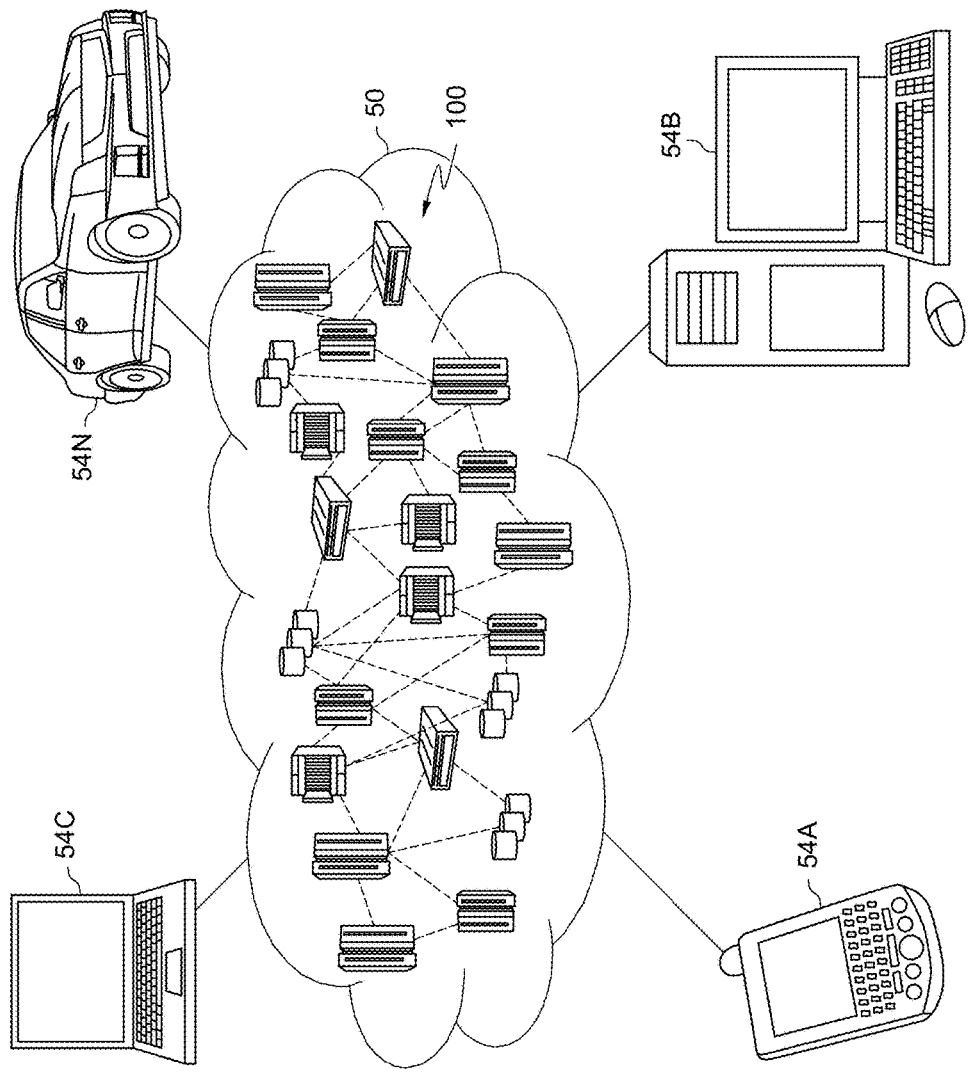
FIG. 6 depicts a cloud computing environment, according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
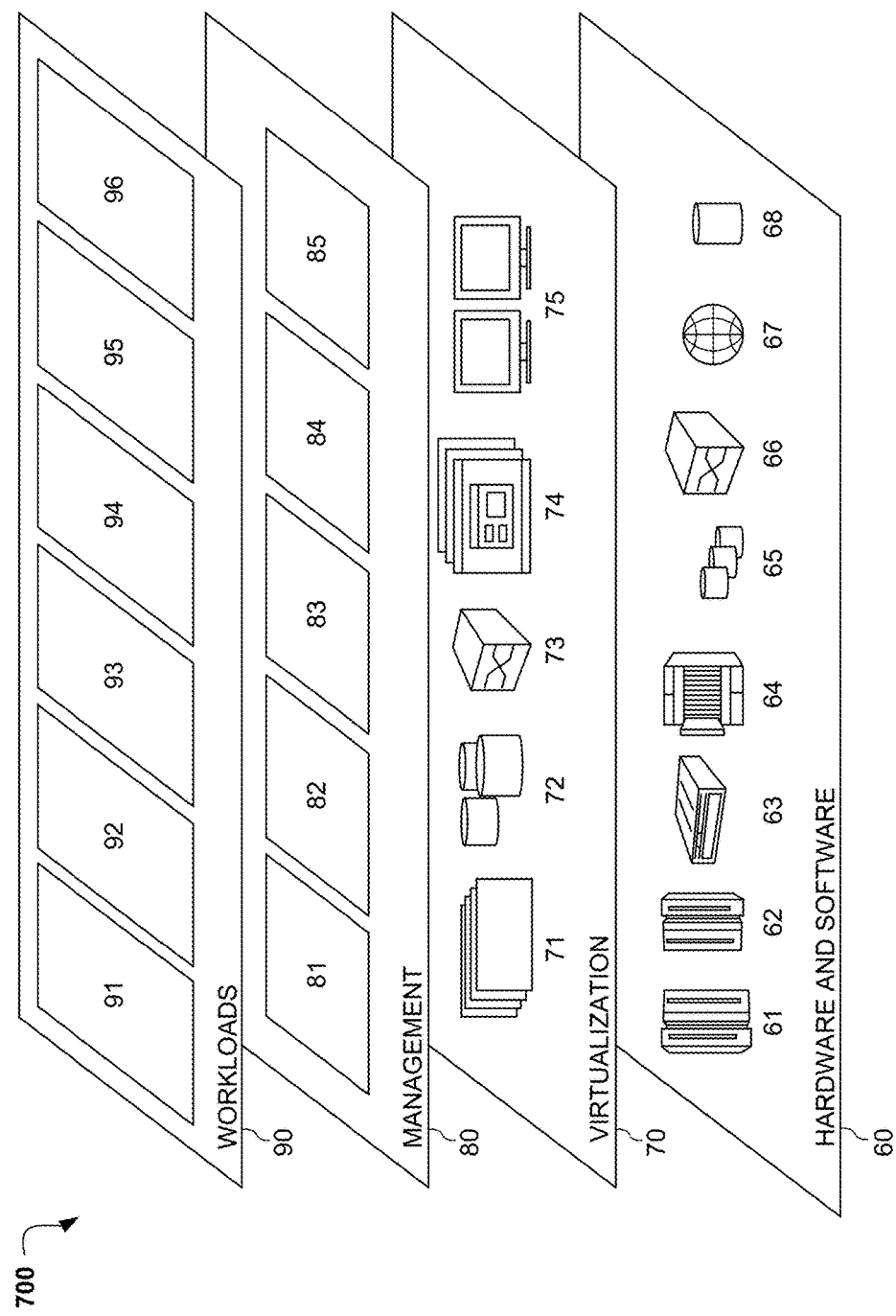
FIG. 7 depicts abstraction model layers, according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source code analysis 96. Source code analysis 96 may relate to identifying and analyzing source code and using SCV or SNG methods to estimate a number of developers that contributed to the source code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for analyzing a plurality of source code, the method comprising:
   identifying the plurality of source code;
   extracting one or more characteristics from a plurality of lines of the plurality of source code;
   analyzing the one or more extracted characteristics for an inclusion relation and a congruent relation, wherein the analyzing includes:
      determining one or more characteristics of a first line;
      determining one or more characteristics of a second line;
      based on determining that each characteristic of the first line either equals the characteristics of the second line or unspecified, setting a relation of the first line is in the inclusion relation in the second line; and
      based on determining that the relation of the first line is in the inclusion relation in the second line and the second line is in the inclusion relation in the first line, setting that the first line and the second line in the congruent relation;
   generating a plurality of node relations of a plurality of nodes based on the inclusion relation and the congruent relation, wherein each node within the plurality of nodes corresponds to each line of the plurality of source code;
   determining a sum of the one or more nodes from the plurality of nodes that have no inclusion relation based on the analyzed inclusion relation and the analyzed congruent relation; and displaying the sum of the determined one or more nodes.

2. The method of claim 1, wherein extracting one or more characteristics from a plurality of lines of the plurality of source code is based on extracting characteristics using a Spacing Characteristics Vector method that decomposes the plurality of lines into a token sequence, and wherein the token sequence represents the one or more characteristics of each one from the plurality of lines.

3. The method of claim 2, wherein the token sequence comprises one or more characters selected from a group comprising of:
   a line identification label;
   a unary operator;
   a binary operator;
   a trinary operator;
   a reserved word;
   a block;
   a parenthesis; and
   a whitespace.

4. The method of claim 1, wherein extracting one or more characteristics from a plurality of lines of the plurality of source code is based on extracting characteristics using a Spacing N-Gram method that decomposes the plurality of lines into a token sequence, and wherein the token sequence represents a sequence of one or more letters and one or more whitespaces, wherein the one or more letters represent instructions, and wherein the one or more whitespaces are spaces typed by a user.

5. The method of claim 4, wherein analyzing the one or more extracted characteristics for an inclusion relation and a congruent relation comprises:
   determining one or more N-gram items and each N-gram item count from a tokenized representation of a first line;
   determining one or more N-gram items and each N-gram item count from a tokenized representation of a second line;
   based on determining that each N-gram item count of the first line and the each N-gram item count of the second line are more than 0 or the corresponding each N-gram item count of the first line does not exist, setting a relation of the first line is in the inclusion relation in the second line; and
   based on determining that the relation of the first line is in the inclusion relation in the second line and the second line is in the inclusion relation in the first line, setting that the first line and the second line in the congruent relation.

6. The method of claim 1, wherein displaying the sum of the determined one or more nodes further comprises:
   determining a name of a developer by matching the one or more nodes from the plurality of nodes that have no inclusion relation to developer data; and
   displaying the name of the developer.

7. A computer system for analyzing a plurality of source code, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying the plurality of source code;
   extracting one or more characteristics from a plurality of lines of the plurality of source code;
   analyzing the one or more extracted characteristics for an inclusion relation and a congruent relation, wherein the analyzing includes:
      determining one or more characteristics of a first line;
      determining one or more characteristics of a second line;
      based on determining that each characteristic of the first line either equals the characteristics of the second line or unspecified, setting a relation of the first line is in the inclusion relation in the second line; and
      based on determining that the relation of the first line is in the inclusion relation in the second line and the second line is in the inclusion relation in the first line, setting that the first line and the second line in the congruent relation;
   generating a plurality of node relations of a plurality of nodes based on the inclusion relation and the congruent relation, wherein each node within the plurality of nodes corresponds to each line of the plurality of source code;
   determining a sum of the one or more nodes from the plurality of nodes that have no inclusion relation based on the analyzed inclusion relation and the analyzed congruent relation; and
   displaying the sum of the determined one or more nodes.

8. The computer system of claim 7, wherein extracting one or more characteristics from a plurality of lines of the plurality of source code is based on extracting characteristics using a Spacing Characteristics Vector method that decomposes the plurality of lines into a token sequence, and wherein the token sequence represents the one or more characteristics of each one from the plurality of lines.

9. The computer system of claim 8, wherein the token sequence comprises one or more characters selected from a group comprising of:
   a line identification label;
   a unary operator;
   a binary operator;
   a trinary operator;
   a reserved word;
   a block;
   a parenthesis; and
   a whitespace.

10. The computer system of claim 7, wherein extracting one or more characteristics from a plurality of lines of the plurality of source code is based on extracting characteristics using a Spacing N-Gram method that decomposes the plurality of lines into a token sequence, and wherein the token sequence represents a sequence of one or more letters and one or more whitespaces, wherein the one or more letters represent instructions, and wherein the one or more whitespaces are spaces typed by a user.

11. The computer system of claim 10, wherein analyzing the one or more extracted characteristics for an inclusion relation and a congruent relation comprises:
   determining one or more N-gram items and each N-gram item count from a tokenized representation of a first line;
   determining one or more N-gram items and each N-gram item count from a tokenized representation of a second line;
   based on determining that each N-gram item count of the first line and the each N-gram item count of the second line are more than 0 or the corresponding each N-gram item count of the first line does not exist, setting a relation of the first line is in the inclusion relation in the second line; and
   based on determining that the relation of the first line is in the inclusion relation in the second line and the second line is in the inclusion relation in the first line, setting that the first line and the second line in the congruent relation.

12. The computer system of claim 7, wherein displaying the sum of the determined one or more nodes further comprises: determining a name of a developer by matching the one or more nodes from the plurality of nodes that have no inclusion relation to developer data; and displaying the name of the developer.

13. A computer program product for analyzing a plurality of source code, the computer program product comprising:
one or more computer-readable tangible storage medium and program instructions stored on at least one of the one or more tangible storage medium, the program instructions executable by a processor, the program instructions comprising:
program instructions to identify the plurality of source code;
program instructions to extract one or more characteristics from a plurality of lines of the plurality of source code;
program instructions to analyze the one or more extracted characteristics for an inclusion relation and a congruent relation, wherein the program instruction to analyze include:
program instructions to determine one or more characteristics of a first line;
program instructions to determine one or more characteristics of a second line;
based on determining that each characteristic of the first line either equals the characteristics of the second line or unspecified, program instructions to set a relation of the first line is in the inclusion relation in the second line; and
based on determining that the relation of the first line is in the inclusion relation in the second line and the second line is in the inclusion relation in the first line, program instructions to set that the first line and the second line in the congruent relation;
program instructions to generate a plurality of node relations of a plurality of nodes based on the inclusion relation and the congruent relation, wherein each node within the plurality of nodes corresponds to each line of the plurality of source code;
program instructions to determine a sum of the one or more nodes from the plurality of nodes that have no inclusion relation based on the analyzed inclusion relation and the analyzed congruent relation; and
program instructions to display the sum of the determined one or more nodes.

14. The computer program product of claim 13, wherein program instructions to extract one or more characteristics from a plurality of lines of the plurality of source code is based on extracting characteristics using a Spacing Characteristics Vector method that decomposes the plurality of lines into a token sequence, and wherein the token sequence represents the one or more characteristics of each one from the plurality of lines.

15. The computer program product of claim 14, wherein the token sequence comprises one or more characters selected from a group comprising of:
a line identification label;
a unary operator;
a binary operator;
a trinary operator;
a reserved word;
a block;
a parenthesis; and
a whitespace.

16. The computer program product of claim 13, wherein program instructions to extract one or more characteristics from a plurality of lines of the plurality of source code is based on program instructions to extract characteristics using a Spacing N-Gram method that decomposes the plurality of lines into a token sequence, and wherein the token sequence represents a sequence of one or more letters and one or more whitespaces, wherein the one or more letters represent instructions, and wherein the one or more whitespaces are spaces typed by a user.

17. The computer program product of claim 16, wherein program instructions to analyze the one or more extracted characteristics for an inclusion relation and a congruent relation comprises:
program instructions to determine one or more N-gram items and each N-gram item count from a tokenized representation of a first line;
program instructions to determine one or more N-gram items and each N-gram item count from a tokenized representation of a second line;
based on determining that each N-gram item count of the first line and the each N-gram item count of the second line are more than 0 or the corresponding each N-gram item count of the first line does not exist, program instructions to set a relation of the first line is in the inclusion relation in the second line; and
based on determining that the relation of the first line is in the inclusion relation in the second line and the second line is in the inclusion relation in the first line, program instructions to set that the first line and the second line in the congruent relation.

* * * * *